A. Foucaut.
Compass.

No. 105,562.  Patented Jul. 19, 1870.

Witnesses:
Godfrey Mathys.
E. S. Taylor.

Inventor:
Alfred Foucaut
by B. F. James, his atty.

United States Patent Office.

ALFRED FOUCAUT, OF ORLEANS, FRANCE.

Letters Patent No. 105,562, dated July 19, 1870.

---

ELECTRO-MAGNETIC ATTACHMENT TO SHIPS' COMPASSES.

---

The Schedule referred to in these Letters Patent and making part of the same.

---

*To all whom it may concern:*

Be it known that I, ALFRED FOUCAUT, of the city of Orleans, in the Empire of France, have invented a new Mode of Application of Magnetic and Electrical Telegraphs to Ships' Compasses, and which I denominate as the "Speaking-Compass—FOUCAUT."

The nature of my invention consists in the construction of a ship's compass in such a manner that the officers in charge of the vessel may see and determine, from the examination of the compass, if the vessel is in or on the direct line or route of travel, and, if not, whether the course of the ship, as steered, is either to the right or left of the same.

Also, in the construction and application of magnetic or electrical telegraphs to such compass, so that, when a circuit is formed, or is complete, an alarm may be sounded that will indicate such divergence from the route, either to the right or left, to the officers in charge of the vessel.

And I do hereby declare the following to be a full and exact description of the construction and operation of the same, reference being had to the annexed drawing making a part of this specification, in which—

Figure 1:
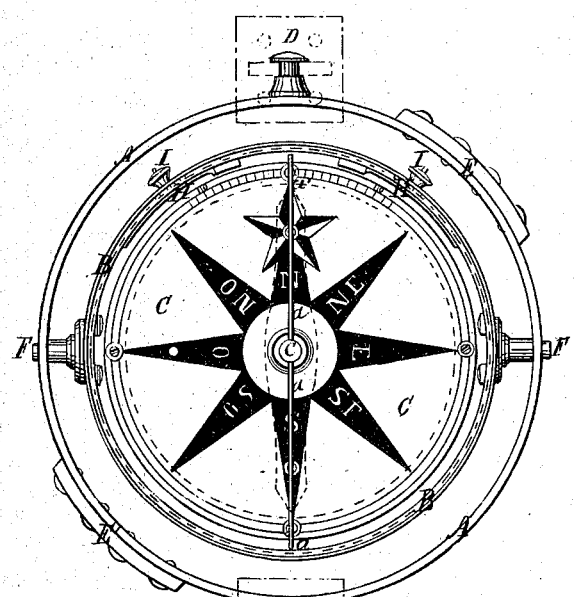

Figure 1 is a top view of the compass, and

Figure 2:
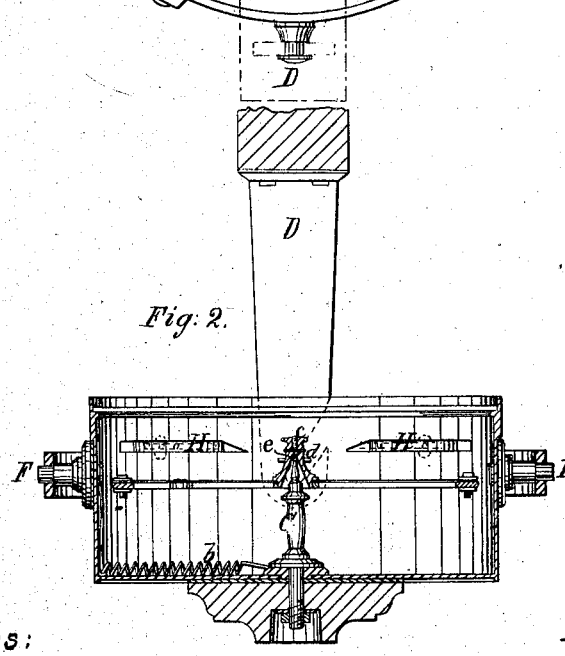

Figure 2 a sectional view of the same through a line drawn from F to F.

This compass consists of an ordinary marine compass, to or in which the following modifications are made:

Above the ordinary compass-card C, (I use, preferably, what is termed a bad-weather card, placed in equilibrium,) which is attached to a magnetized bar or bars, and pivoted on the point *e*, the horizontal copper needle *a a* is placed, and is fastened by the screw *c* to the cap *d*, by which it is fixed in the direction of the ship's keel by the cap *d*.

This needle acts as a copper wire, and its end *a'* is platina-pointed, and projects beyond, and oscillates with, the compass-card C, between the movable metallic inclined planes H H, which are attached to the compass-case, as shown in fig. 2, and move in slots made in said case, and made adjustable by the thumb-screws or rivets I I on the outside of said case, which screws or rivets pass through a spring plate covering the slot, in which the parts H H are moved and adjusted.

The points of the planes or slides H H are coated with platina, silver, or gold.

The needle *a a* may be coated with the same materials, at its point *a*, which oscillates between them, and touches them on any variation of the vessel from its proper course, thereby closing an electric circuit, and causing an alarm to ring.

These inclined planes or slides, being movable, admit of a variation of any required number of points or degrees being given, within which the vessel is considered in its direct line or route of travel.

A bell apparatus, or other alarm, is attached, or may be, to the planes or slides H H, in order to indicate on which side the deviation occurs, and, as these bells may be of different tones, it is easily detected by the proper officer if the vessel is moving in a wrong direction.

The needle *a a* is a common conductor of the battery current, which battery may be located in any convenient position.

One wire is shown in fig. 2, so far as its connection with the compass is concerned, passing through the side of the compass, properly insulated, into the interior of the same, connected with the spindle G, also properly insulated, up to the needle *a a*.

The circle A A, surrounding the compass, is divided, as shown in fig. 1, by means of the rubber connections E, so as to confine the electric or magnetic currents to their proper points.

It is only necessary to connect the positive and negative poles of the battery to the supports D D to prepare the compass for work, then, when the circuit is formed, by reason of the contact of the needle *a a'* with the planes or slides H H, the alarm is sounded. This alarm can be placed or located in any convenient position.

What I claim as my invention, and desire to secure by Letters Patent, is—

1. Indicating, by means of a magnetic or electrical battery connected with a compass of a ship, through and by means of a needle, any variation from the course or route within which the vessel should be guided.

2. The combination, in a marine compass, of the needle *a a*, planes or slides H H, with a magnetic or electrical battery, in the manner and for the purpose herein described.

3. The divided circle A A, its insulators E E, when combined with the compass C, needle *a a*, planes or slides H H, in the manner and for the purpose herein described.

4. The construction and arrangement of a compass, so that, by reason of any material variation in the route of the vessel, the needle of the same will close an electrical or magnetic circuit, and sound an alarm, in the manner and for the purpose herein described.

5. The planes or slides H H, constructed as arranged and described, rendered adjustable, by means of the thumb-pieces I I, in grooves formed upon the sides of the compass, in the manner and for the purpose herein set forth.

6. The combination of the supports D D with the divided circle of the compass A A, the compass C, with its insulated pivots F and G, with an electric or magnetic battery, the whole being constructed, arranged, and operated in the manner and for the purpose herein described.

ALFRED FOUCAUT.

Witnesses:
  C. WIDEMANN,
  WM. E. GRINELL.